United States Patent
Dayka et al.

(10) Patent No.: US 10,229,151 B2
(45) Date of Patent: *Mar. 12, 2019

(54) ESTABLISHING A CHAIN OF TRUST IN A SYSTEM LOG

(71) Applicant: International Business Machines Corporation, Armonk, NY (US)

(72) Inventors: John C. Dayka, New Paltz, NY (US); Mark A. Nelson, Poughkeepsie, NY (US); Kevin H. Peters, Germantown, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 826 days.

This patent is subject to a terminal disclaimer.

(21) Appl. No.: 14/844,281

(22) Filed: Sep. 3, 2015

(65) Prior Publication Data

US 2016/0275129 A1      Sep. 22, 2016

Related U.S. Application Data

(63) Continuation of application No. 14/658,729, filed on Mar. 16, 2015, now Pat. No. 9,922,069.

(51) Int. Cl.
*G06F 17/00* (2006.01)
*G06F 17/30* (2006.01)
*G06F 9/52* (2006.01)

(52) U.S. Cl.
CPC ........ *G06F 17/30371* (2013.01); *G06F 9/526* (2013.01); *G06F 17/30368* (2013.01)

(58) Field of Classification Search
CPC ......... G06F 17/30368; G06F 17/30371; G06F 9/526

USPC ......................................................... 707/694
See application file for complete search history.

(56) References Cited

U.S. PATENT DOCUMENTS

| | | | | |
|---|---|---|---|---|
| 8,468,120 | B2* | 6/2013 | Gupta | G06F 17/30545 707/602 |
| 9,471,119 | B2 | 10/2016 | Dayka | |
| 2003/0220903 | A1 | 11/2003 | Mont et al. | |
| 2010/0088258 | A1 | 4/2010 | Sion | |
| 2011/0145593 | A1* | 6/2011 | Auradkar | G06F 21/6218 713/189 |
| 2012/0278853 | A1 | 11/2012 | Roy-Chowdhury | |

(Continued)

FOREIGN PATENT DOCUMENTS

| CN | 102239472 A | 11/2011 |
|---|---|---|
| CN | 103827865 A | 5/2014 |

OTHER PUBLICATIONS

List of IBM Patents or Patent Applications Treated as Related; (Appendix P), Filed Feb. 9, 2018, 2 pages.

*Primary Examiner* — Robert Stevens
(74) *Attorney, Agent, or Firm* — Cantor Colburn LLP; William Kinnaman

(57) ABSTRACT

Embodiments include a method, system, and computer program product for acquiring a data repository, the data repository being associated with a log configured to receive metadata. Then, a content of the log with respect to at least one manipulation of the data repository is modified by adding first metadata of the metadata. Further, signatures that identify control statements configured to govern the at least one manipulation of the data repository are collected by adding second metadata of the metadata into the log.

4 Claims, 5 Drawing Sheets

Process Flow 200

(56) References Cited

U.S. PATENT DOCUMENTS

| | | | |
|---|---|---|---|
| 2013/0291127 A1* | 10/2013 | Bergman | G06F 17/30 |
| | | | 726/30 |
| 2014/0059013 A1* | 2/2014 | Chao | G06F 21/552 |
| | | | 707/690 |
| 2015/0188715 A1* | 7/2015 | Castellucci | H04L 9/3265 |
| | | | 713/178 |
| 2016/0086260 A1* | 3/2016 | Vermeulen | G06Q 40/00 |
| | | | 705/35 |
| 2016/0171205 A1* | 6/2016 | Bauer | G06F 21/44 |
| | | | 726/26 |
| 2016/0275128 A1 | 9/2016 | Dayka | |

* cited by examiner

ESTABLISHING A CHAIN OF TRUST IN A SYSTEM LOG

DOMESTIC PRIORITY

This application is a continuation of U.S. application Ser. No. 14/658,729, filed on Mar. 16, 2015, the disclosure of which is incorporated by reference herein in its entirety.

BACKGROUND

The present disclosure relates generally to establishing a chain of trust in a system log, and more specifically, to a merging of multiple data streams, recording source and alteration information into a log of the merged data streams, and preserving this information through subsequent processing iterations.

In general, computer systems are constantly recording information about their operations in system logs. These system logs are used for a variety of uses, such as problem diagnosis, charge-back/billing, and security. Users require a mechanism that they can use to assure that a system log has not been modified. Specifically, users need to know that a log record has not been modified, added, or deleted.

Presents techniques that allow such assurance include writing a system log to a "write-once, read many" media (WORM), such as a compact disc read only memory, and digitally signing a content of the system log. However, a problem that is left unaddressed by these techniques is a need to assure that a record has not been altered after it has passed through one or more steps of system log merging, filtering, and/or modification. That is, because the merging, filtering, and/or modification of the system log alters its contents in a way that a final user of a final system log would not be aware, the final user has no way of immediately ascertaining system log alterations (i.e., to determine what records had been merged, filtered, and/or modified) without extensive review and reconciliation between a trusted copy of the source (e.g., WORM) and the final system log.

SUMMARY

Embodiments include a method, system, and computer program product for acquiring a data repository, the data repository being associated with a log configured to receive metadata. Then, a content of the log with respect to at least one manipulation of the data repository is modified by adding first metadata of the metadata. Further, signatures that identify control statements configured to govern the at least one manipulation of the data repository are collected by adding second metadata of the metadata into the log.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, a final user has no way of immediately ascertaining system log alterations without extensive review and reconciliation between a trusted copy of the source (e.g., WORM) and a final system log. Thus, embodiments described herein relate to a merging of multiple data streams, recording source and alteration information into a log of the merged data streams, and preserving this information through subsequent processing iterations.

Figure 1:
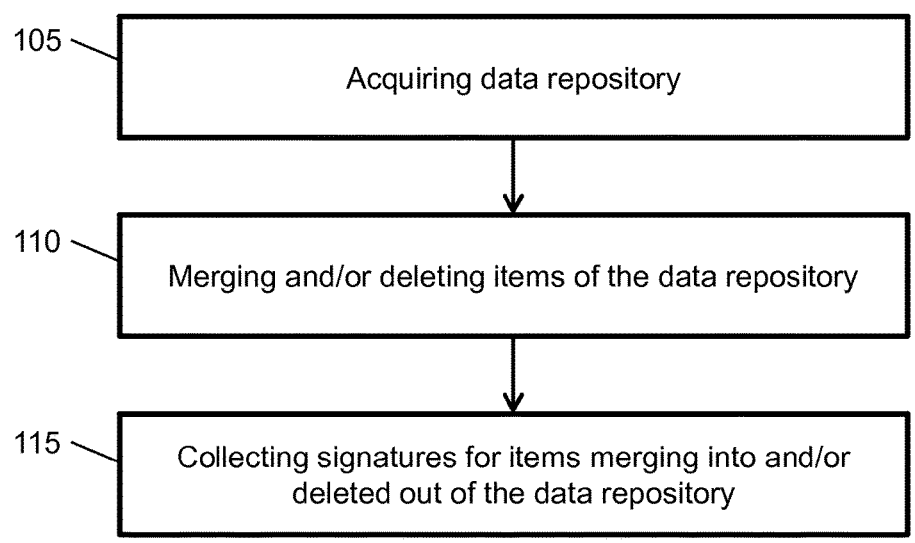
FIG. 1 depicts a process flow of a method of establishing a chain of trust in a system log, in accordance with an embodiment.

Turning now to FIG. 1, a process flow 100 is generally shown in accordance with an embodiment. The process flow 100 begins in block 105 where a processor (as described below with respect to FIG. 3) acquires a data repository. The data repository can be any a set of data, file, a data stream, a plurality and/or combination thereof, etc. The data repository is further associated with a log that stores metadata describing the data repository.

Then, at block 110, the processor merges and/or deletes items of the data repository. For instance, the processor executes a program (e.g., program instructions as described below) that manipulates the data repository, such as by adding new objects, taking data out, merging items together, or combinations thereof. The log is configured to receive additional information or metadata (e.g., first metadata) as the data repository is being processed by the program, which also modifies a content of the log with respect to the manipulation of the data repository. The first metadata can include information about a source (input) of the log that is input to the program, such as system options for recording data, file names, file system container names, volume information about file containers, and any other location information that would be relevant to identifying the source of the log.

Next, at block 115, the processor collects signatures for items merging into and/or deleted out of the data repository. For instance, signatures for components (e.g., objects, data, etc.) going into or out of the data repository, including control statements that direct/govern the merging and/or deleting of items, are collected as part of the additional metadata (e.g., second metadata) for the data repository for each processing iteration of the data repository. The second metadata is the information provided as input to the program that is performing the processing (merging, selection, alteration). The second metadata can include information about a modification program (e.g., source and alteration information), which may be separate from or a part of the program that is manipulating the data repository, being utilized to modify the log. For example, the information about a modification program (e.g., the program as described above) can include a system executing the modification program, a digital signature of the modification program itself, a service level of the modification program, an identity (digital certificate) of a user running the program, a date and time that the program was executed. In this way, the signatures can preserve the source and alteration information through subsequent processing iterations.

Further, the log may receive third metadata that can include information about the modifications that are being made to the log records, such as rules for merging, deleting, and/or modifying records of the log. That is, the third metadata can include the addition of signature information added to the first and/or second metadata. Note that the additional information or metadata received by the log during the process flow 100 is grouped into first, second, and third metadata for ease of explanation.

In addition, while the process flow 100 generally relates system logs, the process flow 100 can be applied anytime data is being aggregated or processed. For example, when sensor data is received from an "internet of things" or when receiving "crowd sourced" data, an aggregation operation can include processing the sensor data according the process flow 100.

Figure 2:
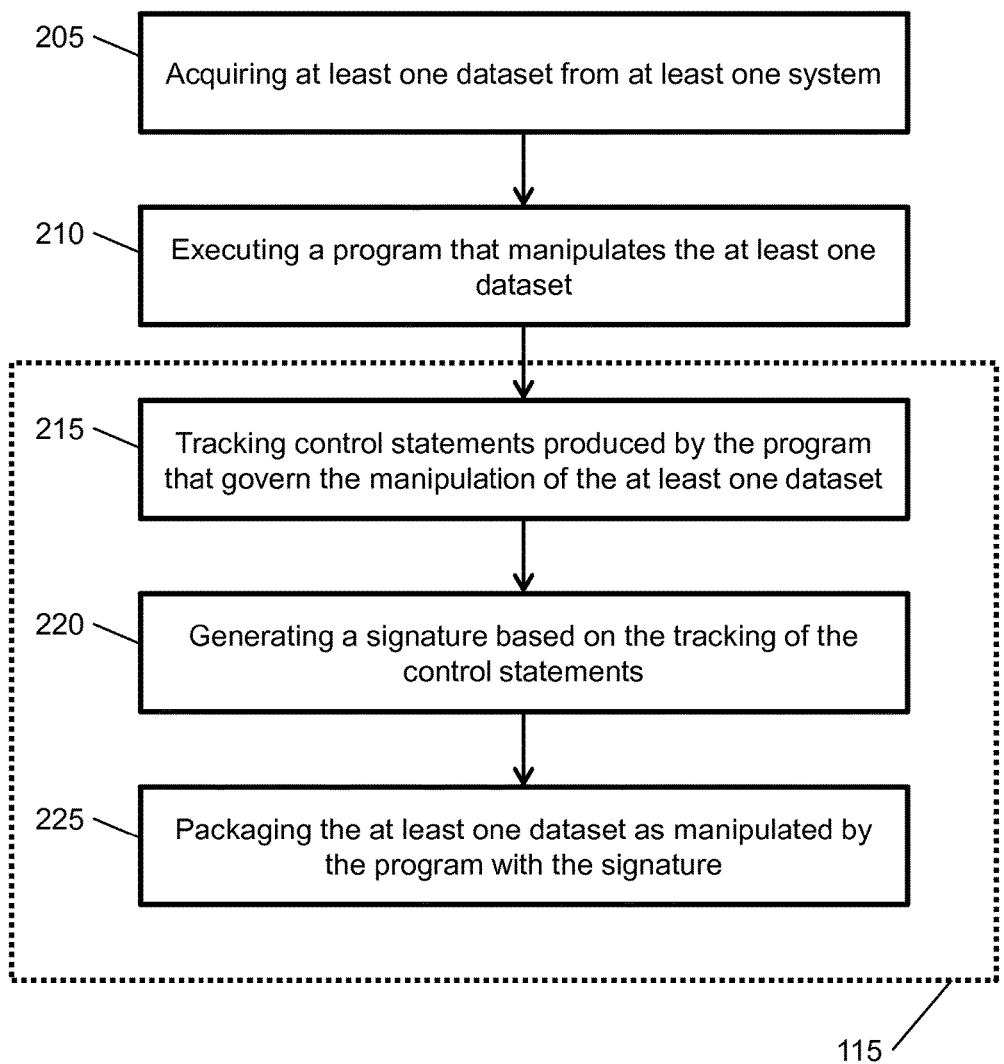
FIG. 2 depicts another process flow of a method of establishing a chain of trust in a system log, in accordance with an embodiment.

Turning now to FIG. 2, a process flow 200 is generally shown in accordance with an embodiment. The process flow 200 corresponds to the process flow 100, in that FIG. 2 includes a dotted-block 115 to illustrate an example of how to perform the collection of the signatures for the items merging into and/or deleted out of the data repository. Further, block 205 corresponds to block 105 and block 210 corresponds to block 110.

The process flow 200 begins in block 205 where a processor acquires at least one data set for from at least one system. For example, the processor can receive one data set for a time range within a period, for a plurality of periods. That is, if the data set for each time range is at least one data stream, the time range is twenty-four hours (e.g., a single day), the period is a 120 hours (e.g., a work week), then the processor would acquire five data sets for each of the five days within the work week. Note that time is only one example of a merge, and other merge scenarios may be implemented in accordance with the requirements of the program. Then, at block 210, the processor executes a program that manipulates the at least one data set. As indicated above, the processor can add, merge, and/or delete items of the data repository.

Next, at block 215, the processor tracks control statements produced by the program. The control statements govern the manipulation of the at least one data set. Then, at block 220, the processor generates (e.g., performs a calculation, creation, and insertion of) signature. The signature is based on the tracking of the control statements.

Next, at block 225, the processor packages the at least one data set as manipulated by the program with the signature. In this way, the processor outputs a packaged data set, which includes manipulated data set plus the signature. The signature identified what was merged or altered and is stored within the metadata of the packaged data set.

An example of a system environment will now be described in view of the process flows 100, 200. In the system environment, one of the logs can be a systems management facility (SMF) log, in which operating system, subsystems, resource managers, and users of the system environment write records to the SMF log. The SMF log can be used for billing users for their resource consumption, recording actions of users against resources as directed by security administrators and the external security manager (e.g., resource access control facility), and diagnostics. Note that while this example of the system environment is provided, the system environment could be adapted on any log-style data store, so as to perform a validation of signature blocks.

All of these records are written to SMF logs, and users can choose to place their SMF log into data sets or into one or more system environment log streams. For example, users can manage SMF data by writing "live" system SMF data to a daily file, the daily files to a weekly file, the weekly files into a monthly file, the monthly files to quarterly and/or yearly files; by aggregating the SMF data from multiple systems; and by copying and splitting the SMF data into operational categories, such as charge-back/billing, security. The users can also manage SMF data through a diagnosis. At each step of the process, records are merged, added, and/or deleted. Utilizing the process flows 100, 200, user can determine how the SMF data was manipulated.

For instance, programs utilized to process SMF data can be an SMF data set utility (SMFDP) and an SMF log stream utility (SMFDL). The system environment can create an information block about a source of information at the time original SMF data sets are written. This information block could include the first metadata described above and could be part of the data that is written to the original SMF data set and signed by the SMF itself.

Then, when the user runs SMFDx (e.g., SMFDP and/or SMFDL) to move the SMF data from the live log to a non-live data set, SMFDx would create an information block about the source of the information and the instance of SMFDx that is moving the data. This source of the information could include the second metadata described above and a signature of the SMFDx. Note that any subsequent running of the SMFDP would perform the same processing, while each iteration of the SMFDx adds a new processing block that is added to the output stream and a new signature.

Further, a system key would be used to sign the SMF records as created by the SMF. The key used to sign the output of the SMFDx could depend on a user identification, which was associated with an execution of the SMFDP. The key signing and leveraging of the user identification provides not only assurance on how the SMF records were processed, but also by whom. Also, SMFDx could be modified to provide a signature validation facility at each step of the process.

The present invention may be a system (e.g., implemented on a cloud computing environment), a method, and/or a computer program product. Further, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The computer program product may include a computer readable storage medium (or media) having computer readable program instructions thereon for causing a processor to carry out aspects and/or embodiments of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With respect to implementing aspect and/or embodiments of the present invention on cloud computing environment, cloud computing in general is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics can be on-demand self-service; broad network access; resource pooling; rapid elasticity; and measured service.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Three service models can include Software as a Service (SaaS); Platform as a Service (PaaS); and Infrastructure as a Service (IaaS).

SaaS: the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

PaaS: the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

IaaS: the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models can include private cloud; community cloud, public cloud; and hybrid cloud.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 3:
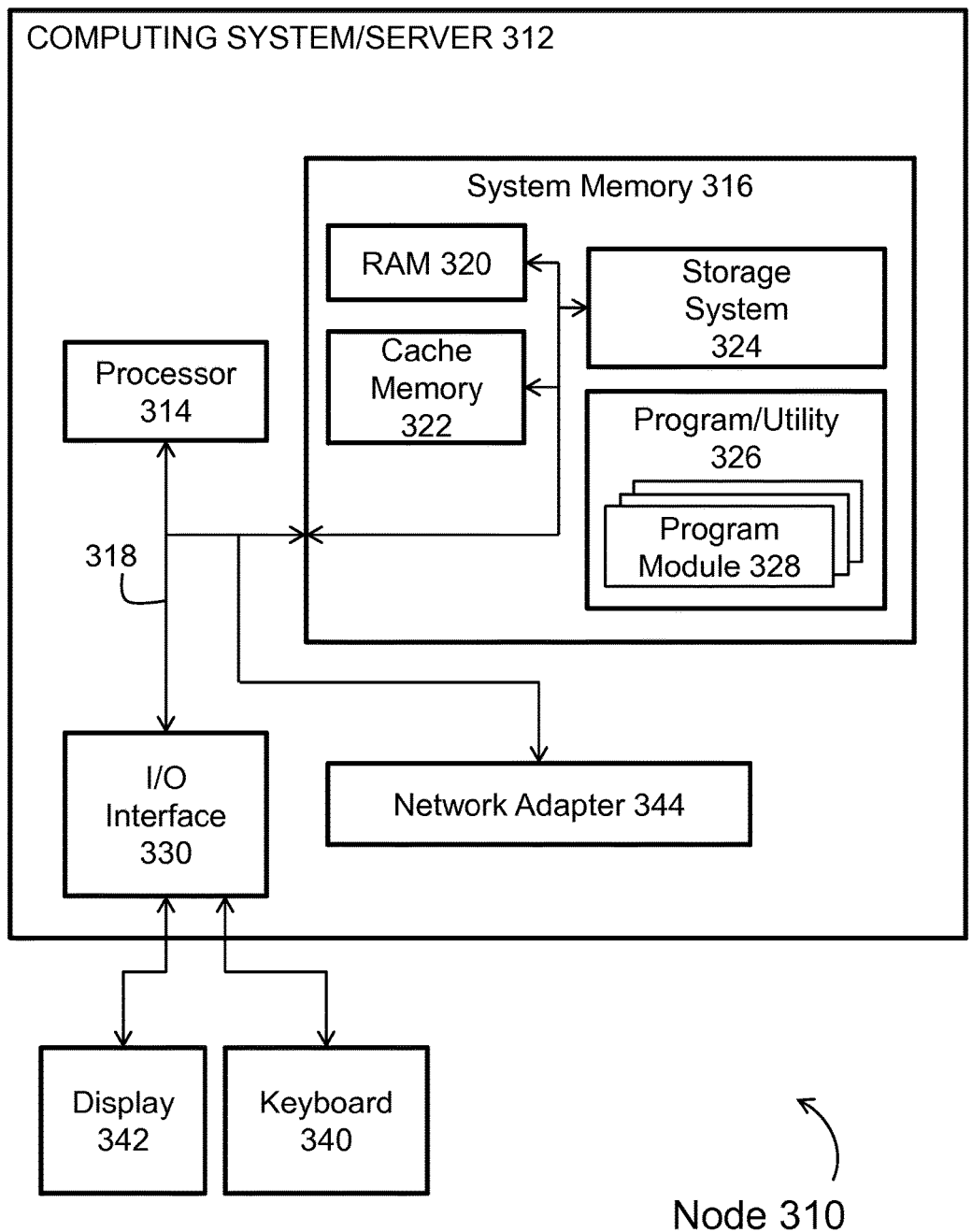
FIG. 3 depicts a cloud computing node according to an embodiment of the present invention.

Referring now to FIG. 3, a schematic of an example of a cloud computing node is shown. A cloud computing node 310 is only one example of a suitable cloud computing node and is not intended to suggest any limitation as to the scope of use or functionality of embodiments of the invention described herein. Regardless, the cloud computing node 310 is capable of being implemented and/or performing any of the functionality set forth hereinabove.

In the cloud computing node 310 there is a computer system/server 312, which is operational with numerous other general purpose or special purpose computing system environments or configurations. Examples of well-known computing systems, environments, and/or configurations that may be suitable for use with the computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 312 may be described in the general context of computer system executable instructions, such as program modules, being executed by a computer system. Generally, program modules may include routines, programs, objects, components, logic, data structures, and so on that perform particular tasks or implement particular abstract data types. The computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system/server 312 in the cloud computing node 310 is shown in the form of a general-purpose computing device. The components of the computer system/server 312 may include, but are not limited to, one or more processors or processing units (e.g., processor 314), a system memory 316, and a bus 318 that couples various system components including the system memory 316 to the processor 314.

The bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 312 typically includes a variety of computer system readable media. Such media may be any available media that is accessible by the computer system/server 312, and it includes both volatile and non-volatile media, removable and non-removable media.

The system memory 316 can include computer system readable media in the form of volatile memory, such as a random access memory (RAM) 320 and/or a cache memory 322. The computer system/server 312 may further include other removable/non-removable, volatile/non-volatile computer system storage media. By way of example only, storage system 324 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 318 by one or more data media interfaces. As will be further depicted and described below, the system memory 316 may include at least one program product having a set (e.g., at least one) of program modules that are configured to carry out the functions of embodiments of the invention.

For example, a program/utility 326, having a set (at least one) of program modules (e.g., a program module 328), may be stored in the system memory 316 by way of example, and not limitation, as well as an operating system, one or more application programs, other program modules, and program data. Each of the operating system, one or more application programs, other program modules, and program data or some combination thereof, may include an implementation of a networking environment. The program modules 326 generally carry out the functions and/or methodologies of embodiments of the invention as described herein.

The computer system/server 312 may also communicate (e.g., via Input/Output (I/O) interfaces, such as I/O interface 330) with one or more external devices, such as a keyboard 340, a pointing device, a display 342, etc.; one or more devices that enable a user to interact with the computer system/server 312; and/or any devices (e.g., network card, modem, etc.) that enable the computer system/server 312 to communicate with one or more other computing devices. Still yet, the computer system/server 312 can communicate with one or more networks such as a local area network (LAN), a general wide area network (WAN), and/or a public network (e.g., the Internet) via a network adapter 344. As depicted, the network adapter 344 communicates with the other components of the computer system/server 312 via the bus 318. It should be understood that although not shown, other hardware and/or software components could be used in conjunction with the computer system/server 312. Examples, include, but are not limited to: microcode, device drivers, redundant processing units, external disk drive arrays, RAID systems, tape drives, and data archival storage systems, etc.

Figure 4:
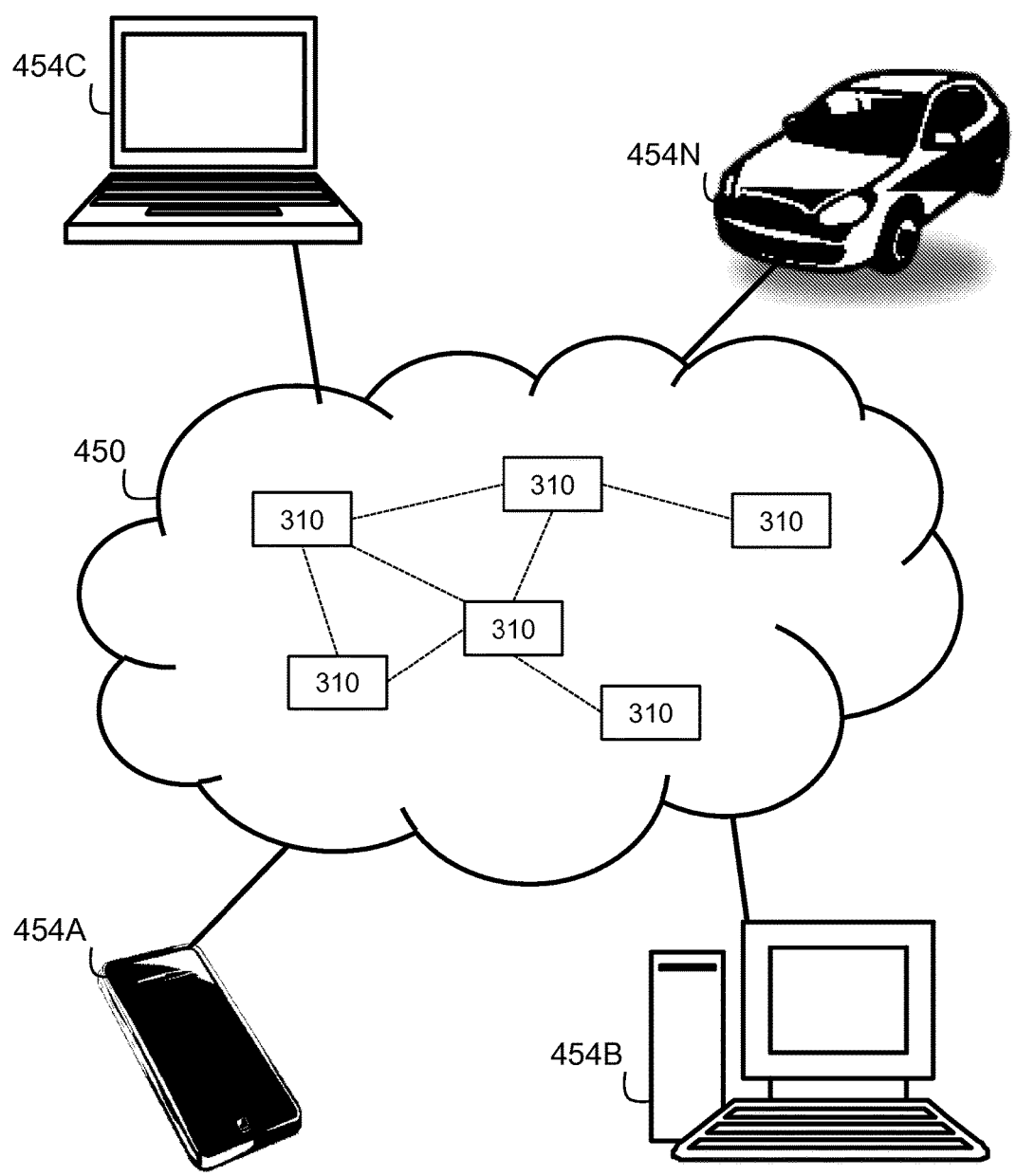
FIG. 4 depicts a cloud computing environment according to an embodiment of the present invention.

Referring now to FIG. 4, illustrative cloud computing environment 450 is depicted. As shown, the cloud computing environment 450 comprises one or more cloud computing nodes 310 with which local computing devices used by cloud consumers, such as, for example, a personal digital assistant (PDA) or cellular telephone 454A, a desktop computer 454B, a laptop computer 454C, and/or an automobile computer system 454N may communicate. The cloud computing nodes 310 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that the computing nodes 310 and cloud computing environment 450 can communicate with any type of computerized device over any type of network and/or network addressable connection (e.g., using a web browser).

Figure 5:
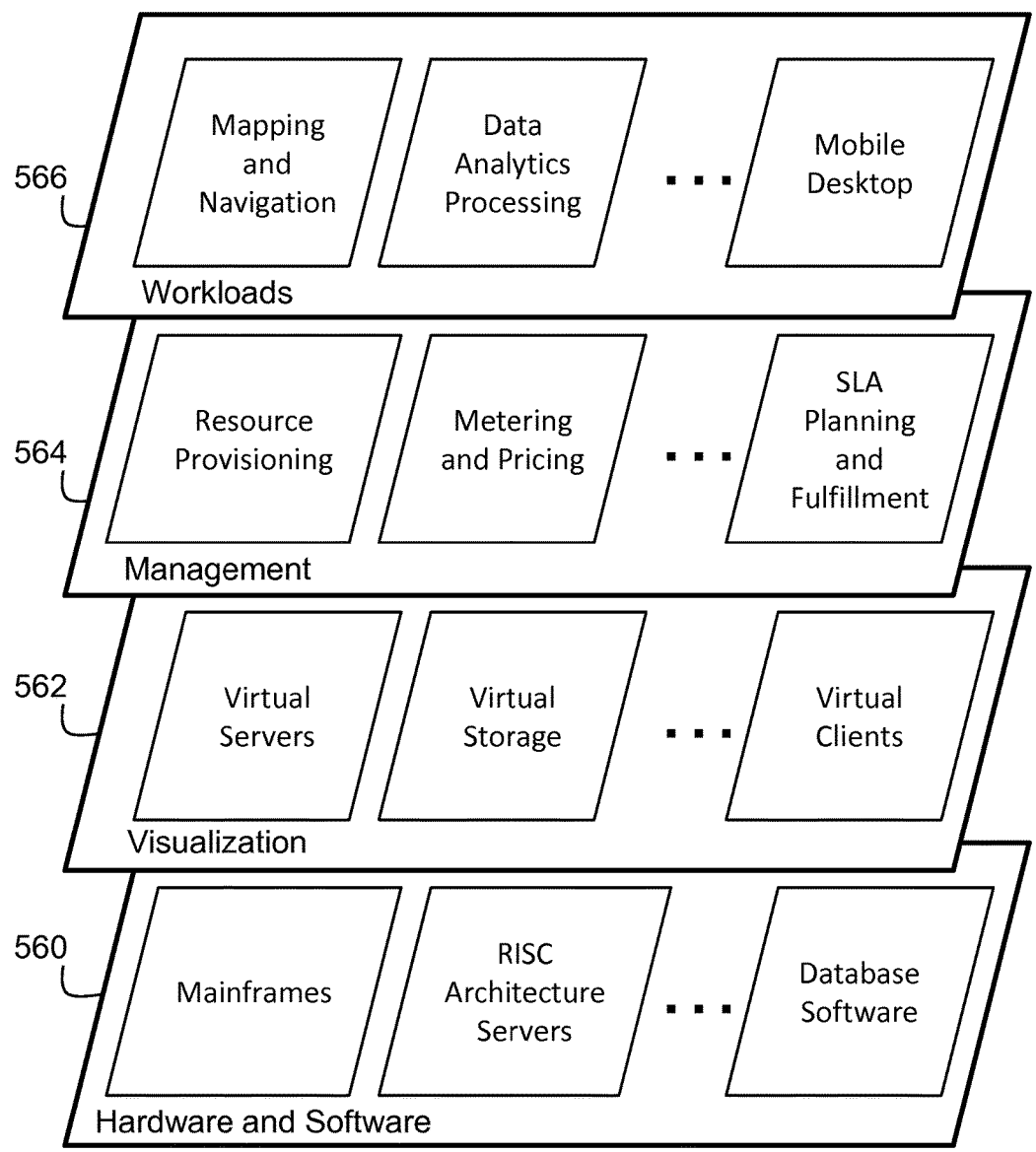
FIG. 5 depicts abstraction model layers according to an embodiment of the present invention.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

A hardware and software layer 560 includes hardware and software components. Examples of hardware components include: mainframes; RISC (Reduced Instruction Set Computer) architecture based servers; storage devices; networks and networking components. In some embodiments, software components include network application server software.

A virtualization layer 562 provides an abstraction layer from which the following examples of virtual entities may be provided: virtual servers; virtual storage; virtual networks, including virtual private networks; virtual applications and operating systems; and virtual clients.

In one example, a management layer 564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators.

Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

A workloads layer 566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Technical effects and benefits embodiments described herein relate to preserving source and alteration information into a log through subsequent processing iterations of data streams, i.e., subsequent filtering, merging, and modification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   acquiring, by a processor, a data repository, the data repository being associated with a log configured to receive metadata;
   modifying, by the processor, a content of the log with respect to at least one manipulation of the data repository by adding first metadata of the metadata, wherein the at least one manipulation of the data repository includes adding, deleting, or merging of components of the data repository; and
   collecting, by the processor, signatures that identify control statements configured to govern the at least one manipulation of the data repository: adding second metadata of the metadata into the log, packaging a modified data repository, the modified data repository including the data repository as changed by the at least one manipulation and the log with the metadata, tracking the control statements produced by a program executed by the processor, and generating the signatures based on the tracking of the control statements,
   wherein the signatures preserve source and alteration information for each manipulation of the data repository.

2. The method of claim 1, wherein the first metadata includes information about a source of the log.

3. The method of claim 1, wherein the second metadata includes information about a modification program utilized to modify the content of the log.

4. The method of claim 1, wherein the metadata includes third metadata, the third metadata including rules for merging, deleting, or modifying the data repository or the log.

* * * * *